No. 629,608. Patented July 25, 1899.
J. C. ROBERTS.
BEATER AND SIFTER.
(Application filed Apr. 5, 1899.)
(No Model.)

WITNESSES:
O. W. Smith
C. R. Ferguson

INVENTOR
John C. Roberts.
BY
ATTORNEYS

THE NORRIS PETERS CO., PHOTO-LITHO., WASHINGTON, D. C.

UNITED STATES PATENT OFFICE.

JOHN C. ROBERTS, OF BEDFORD, PENNSYLVANIA.

BEATER AND SIFTER.

SPECIFICATION forming part of Letters Patent No. 629,608, dated July 25, 1899.

Application filed April 5, 1899. Serial No. 711,831. (No model.)

*To all whom it may concern:*

Be it known that I, JOHN C. ROBERTS, of Bedford, in the county of Bedford and State of Pennsylvania, have invented a new and Improved Beater and Sifter, of which the following is a full, clear, and exact description.

This invention relates to improvements in machines for sifting flour or the like and also for beating eggs and other ingredients and mixing the same with the flour; and the object is to provide a simple machine of this character and so constructed that the parts may be separated one from the other, and, further, to provide means whereby the beater and sifter may be operated both together or each singly.

I will describe a beater and sifter embodying my invention and then point out the novel features in the appended claims.

Reference is to be had to the accompanying drawings, forming a part of this specification, in which similar characters of reference indicate corresponding parts in all the views.

Figure 1:
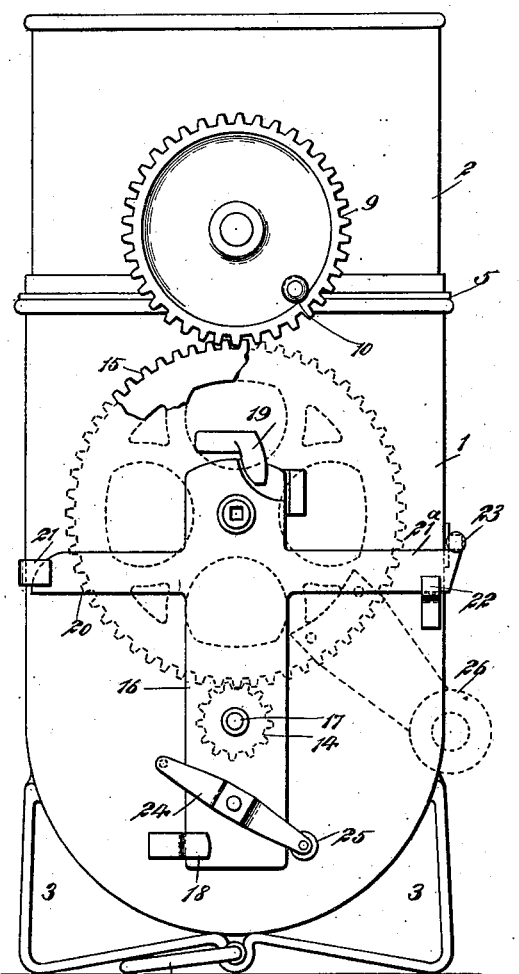
Figure 2:
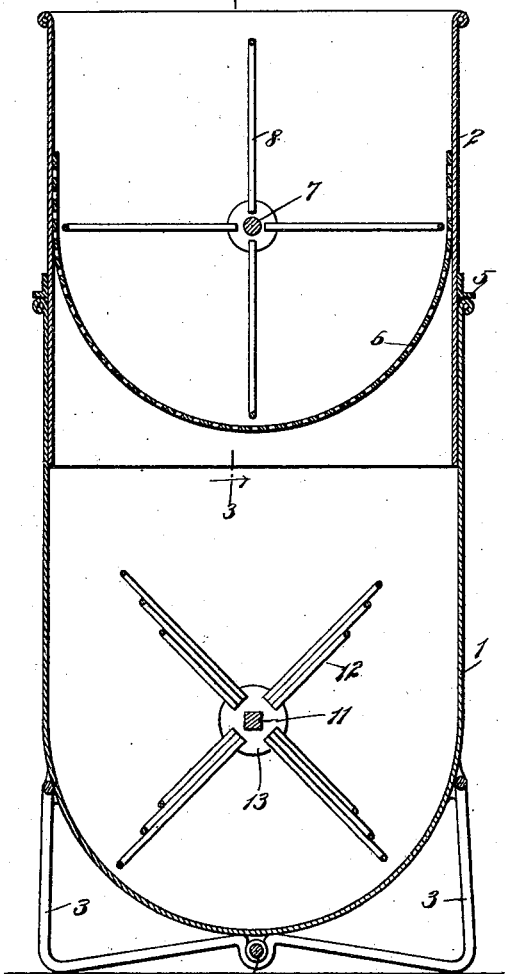
Figure 3:
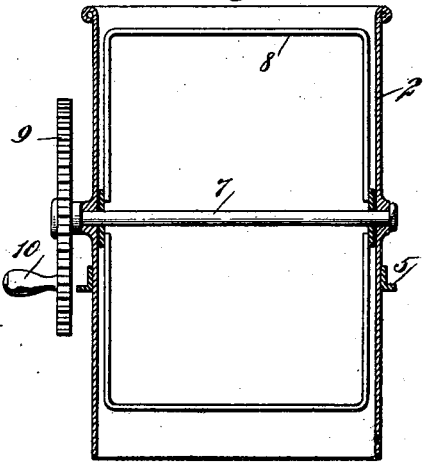

Figure 1 is a front elevation of a machine embodying my invention. Fig. 2 is a vertical section thereof, and Fig. 3 is a section on the line 3 3 in Fig. 2.

The machine comprises a beater-casing 1 and a sifter-casing 2, the beater-casing being herein shown rounded at its bottom and supported on legs 3, and connected to these legs I have shown a device 4 for securing the machine to a table-top or other similar support. The sifter-casing 2 is designed to be removably seated in the upper end of the casing 1, and it is provided at its outer side with flanges 5, designed to rest upon the upper end of the casing 1 and hold the casing 2 in its proper position. The casing 2 has a sieve-bottom 6, and mounted on a shaft 7, adapted to rotate in the casing, are agitators 8, which may be formed of wire.

On an outwardly-extended end of the shaft 7 is a gear-wheel 9, having a crank-handle 10. Mounted to rotate in the casing 1 is a shaft 11, on which is mounted a series of beater-arms 12. The shaft 11 is removable from the casing, and so are the beaters 12. This is for convenience in cleaning the parts.

To make the beaters 12 separable from the shaft 11, said beaters have their ends secured to disks 13, through which the shaft loosely passes. One of these disks, however, will have a square opening through which a correspondingly-shaped portion of the shaft may pass, so that the beaters will rotate with the shaft.

On the outer end of the shaft 11 is a pinion 14, adapted to engage with a drive-gear 15, mounted to rotate on a stud fixed to a swinging frame 16. This swinging frame 16 swings on a tubular stud 17, connected to the casing 1, and through this tubular stud the shaft 11 passes. The movable frame when in position engages its lower portion within a keeper 18, attached to the casing, and its upper end is engaged by a clip 19, secured to the casing. One of its outwardly-extended arms 20 will engage in a keeper 21, secured to the casing, and the other of its outwardly-extended arms 21$^a$ will engage in a keeper 22. When the parts are in the position shown, the frame will be held from movement by means of a pin 23, engaging on the upper side of the arm 21$^a$ and passing into a socket on the frame.

Mounted to swing on the lower portion of the frame 16 is a latch-plate 24. This plate 24 is designed to be engaged with one of its ends against the outer end of the shaft 11 or against the pinion thereon to prevent accidental outward movement of said shaft. The opposite end of the plate is provided with a valve 25, designed to close the opening through the tubular stud 17 when the shaft 11 is removed, so as to prevent outflow of the material from the casing 1 when the shaft and beater are removed.

In operation the eggs and sugar or other material may be placed in the casing 1 and then after placing the sifter-casing in position the flour is to be placed therein. At this time the gear-wheel 9 will engage with the gear 15 and the pinion 14 will also be in mesh with the gear 15. Then by rotating the gear 9 by means of the crank-handle 10 it is obvious that both the agitators and beaters will be rotated and that because of the smaller size of the pinion 14 the beaters will be rotated much faster than the agitators. After a sufficient amount of flour has been sifted into the casing 1 said casing may be removed and the beaters again rotated, as described, if such operation is found necessary; and, further, by releasing the frame 16 and moving it laterally to disengage the gear-wheel 15 from the gear 9 the sifting device may be operated while arranged in the casing 1 without imparting motion to the beaters. Further, it is obvious that the devices may be used one independently of the other, if desired.

Having thus fully described my invention, I claim as new and desire to secure by Letters Patent—

1. A beater and sifter, comprising a beater-casing, a beater mounted to rotate therein, a sifter-casing adapted to be removably seated in the beater-casing, an agitator in the sifter-casing, a removable shaft for the beater, a spring-plate for holding said shaft from longitudinal movement, means for stopping the opening for the shaft when said shaft is removed, and means for rotating both the agitator and beater, substantially as specified.

2. A beater and sifter, comprising a beater-casing, a beater mounted to rotate therein, a sifter-casing, an agitator mounted to rotate therein, said sifter-casing being adapted to be removably seated in the agitator-casing, a gear-wheel on the shaft of the agitator, a pinion on the shaft of the beater, a driving-gear for engagement with said first-named gear and with the pinion, and a swinging frame on which the driving-gear is mounted, substantially as specified.

3. A beater and sifter, comprising a beater-casing, a beater mounted to rotate therein, a sifter-casing adapted to be removably seated in the beater-casing, an agitator in the sifter-casing, a gear-wheel on the shaft of said agitator, a removable shaft for the beater, a pinion on said shaft, a spring-plate for engaging said pinion to hold the shaft from longitudinal movement, a valve on said plate, for stopping the opening for the shaft when said shaft is removed, and a driving-gear for engaging with the first-named gear and with the pinion, substantially as specified.

JOHN C. ROBERTS.

Witnesses:
WM. S. LYSINGER,
JNO. C. WRIGHT.